(12) United States Patent
Richter

(10) Patent No.: US 11,749,187 B2
(45) Date of Patent: Sep. 5, 2023

(54) COMPONENT FOR A DISPLAY DEVICE, DISPLAY DEVICE AND METHOD OF OPERATING THE DISPLAY DEVICE

(71) Applicant: OSRAM Opto Semiconductors GmbH, Regensburg (DE)

(72) Inventor: Daniel Richter, Bad Abbach (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 0 days.

(21) Appl. No.: 17/602,232

(22) PCT Filed: Mar. 11, 2020

(86) PCT No.: PCT/EP2020/056507
§ 371 (c)(1),
(2) Date: Oct. 7, 2021

(87) PCT Pub. No.: WO2020/207689
PCT Pub. Date: Oct. 15, 2020

(65) Prior Publication Data
US 2022/0180808 A1 Jun. 9, 2022

(30) Foreign Application Priority Data
Apr. 8, 2019 (DE) .................... 10 2019 109 137.3

(51) Int. Cl.
*G09G 3/3216* (2016.01)
*G09G 3/00* (2006.01)

(52) U.S. Cl.
CPC ........... *G09G 3/3216* (2013.01); *G09G 3/006* (2013.01); *G09G 2300/026* (2013.01);
(Continued)

(58) Field of Classification Search
CPC ........ G09G 3/32; G09G 3/3216; G09G 3/006; G09G 2300/02; G09G 2300/026;
(Continued)

(56) References Cited

U.S. PATENT DOCUMENTS

| 7,187,393 B1* | 3/2007 | Tokimoto ................. G09G 3/32 345/694 |
| 2002/0043923 A1 | 4/2002 | Natori |

(Continued)

FOREIGN PATENT DOCUMENTS

| CN | 109346004 A | 2/2019 |
| DE | 202017106116 U1 | 11/2017 |

(Continued)

OTHER PUBLICATIONS

International Search Report and Written Opinion issued in International Patent Application No. PCT/EP2020/056507 dated Jul. 27, 2020.

(Continued)

*Primary Examiner* — Jimmy H Nguyen
(74) *Attorney, Agent, or Firm* — ArentFox Schiff

(57) ABSTRACT

A component for a display device, a display device and a method for operating the display device, a computer program and a storage medium are disclosed. The component comprises LED chips arranged in rows, wherein one red, one green and one blue LED chip are arranged alternately per row in the extension direction of the respective row and per column obliquely to the extension direction, and the rows have an offset from one another in the extension direction.

16 Claims, 5 Drawing Sheets

(52) U.S. Cl.
CPC ............ *G09G 2300/0452* (2013.01); *G09G 2310/0297* (2013.01); *G09G 2330/08* (2013.01); *G09G 2330/10* (2013.01)

(58) Field of Classification Search
CPC ............ G09G 2300/0452; G09G 2310/0297; G09G 2330/10; G09G 2330/08; G06F 3/1446
USPC ................................................... 345/1.3, 83
See application file for complete search history.

(56) References Cited

U.S. PATENT DOCUMENTS

| | | |
|---|---|---|
| 2002/0140713 A1 | 10/2002 | Klompenhouwer et al. |
| 2007/0046689 A1 | 3/2007 | Tokimoto et al. |
| 2011/0140999 A1 | 6/2011 | Beland et al. |
| 2014/0001499 A1* | 1/2014 | Zhou ..................... H01L 27/156 257/89 |
| 2015/0373793 A1* | 12/2015 | Bower ..................... F21V 9/08 362/20 |
| 2019/0305036 A1* | 10/2019 | Ahn ........................ H01L 33/62 |

FOREIGN PATENT DOCUMENTS

| | | |
|---|---|---|
| JP | 2000353825 A | 12/2000 |
| JP | 2002062825 A | 2/2002 |
| JP | 2004531755 A | 10/2004 |
| JP | 2007286412 A | 11/2007 |
| JP | 2017015943 A | 1/2017 |
| JP | 2018151519 A | 9/2018 |

OTHER PUBLICATIONS

Office Action in JP2021558902, dated Nov. 8, 2022, 6 pages.

* cited by examiner

COMPONENT FOR A DISPLAY DEVICE, DISPLAY DEVICE AND METHOD OF OPERATING THE DISPLAY DEVICE

This patent application is a 35 U.S.C. § 371 National Phase of PCT Application No. PCT/EP2020/056507, filed Mar. 11, 2020, which claims priority to German patent application DE 102019109137.3, filed Apr. 8, 2019, the disclosure content of each are hereby incorporated by reference.

The invention relates to a component for a display device, as well as to a display device and a method for operating the display device. Furthermore, a computer program for operating the display device and a computer-readable storage medium are disclosed.

Display devices such as video walls can be constructed from discrete LEDs (so-called "LED walls") to display individual picture elements (pixels).

The object underlying the invention is to provide a component for such a display device, as well as a display device and a method of operating the same, which permits simple manufacture of the display device and helps to keep the costs of manufacture low.

The object is solved by the independent patent claims. Advantageous embodiments are indicated in the dependent claims.

In accordance with a first aspect of the invention, a component for a display device is disclosed.

The component is, for example, a surface-mounted device (SMD) on a printed circuit board (PCB). In particular, a plurality of such components may be arranged horizontally and/or vertically side by side on the PCB to form a video wall.

In one embodiment according to the first aspect, the component comprises LED chips arranged in rows.

The LED chips (LED, "light-emitting diode") are configured to emit light in the intended operation, i.e. in particular depending on an external control signal. In particular, each LED chip is designed to be separately controllable.

Here and in the following, a row arrangement of the LED chips is understood to be a collinear arrangement of the LED chips of a same row within the scope of manufacturing accuracy, as well as a parallel arrangement of a plurality of rows with respect to each other. In other words, the rows each have a parallel extension direction. In particular, a plurality of LED chips are associated with one row. Preferably, the number of LED chips of a row corresponds to the number of rows of the component.

In particular, the LED chips are arranged in such a way that their main radiation direction is perpendicular to a plane spanned by the adjacent parallel rows during intended operation. In other words, in the case of surface mounting of the component, a light cone caused by the LED chips is perpendicular to the mounting circuit board.

In one embodiment according to the first aspect, one red LED chip, one green LED chip and one blue LED chip are alternately arranged per row in the extension direction of the respective row and per column obliquely to the extension direction.

A column arrangement of the LED chips is understood herein and hereinafter to be a collinear arrangement of the LED chips of a same column within the scope of manufacturing accuracy, as well as a parallel arrangement of a plurality of columns with respect to each other. In this context, the columns enclose a predetermined angle with the rows so that the columns are aligned obliquely with respect to the extension direction. The predetermined angle is between 0° and 90°, for example between 45° and 75° inclusive, in particular 60°.

In this context, a red LED chip refers to an LED chip that is designed to emit red light, i.e., light of a wavelength between 650 nm and 750 nm. Similarly, a green LED chip refers to an LED chip designed to emit green light or light of a wavelength between 490 nm and 575 nm, and a blue LED chip refers to an LED chip designed to emit blue light or light of a wavelength between 420 nm and 490 nm.

The red LED chip, the green LED chip and the blue LED chip are arranged directly adjacent to one another, in particular in a predetermined color sequence, so that the same colors follow one another both in the extension direction and obliquely to the extension direction. In the event that the component has more than three LED chips per row or column, the arrangement of the LED chips is repeated in particular in such a way that the predetermined color sequence is maintained or continued.

In an embodiment according to the first aspect, the rows have an offset with respect to each other in the extension direction.

In particular, all successive rows of the component have the same offset to each other. The offset is selected in such a way that the above-mentioned predetermined angle between the columns and the extension direction is established. In particular, the offset causes a parallelogram, for example a rhombus, to be spanned by the LED chips of the component.

In one embodiment according to the first aspect, a component for a display device is provided which comprises LED chips arranged in rows, wherein one red, one green and one blue LED chip are arranged alternately per row in an extension direction in which the respective row extends and per column obliquely to the extension direction, and the rows are offset from one another in the extension direction in which they extend.

Such a structure of the component enables a particularly efficient use of individual LED chips of the component for representing a plurality of pixels of a display device. In an advantageous manner, fewer LED chips and thus fewer contacts of the component are required for contacting the individual LED chips in order to represent a predetermined number of pixels of the display device. An associated space saving can be utilized, by way of example, by using larger solder pads for contacting, so that a more stable solder connection and/or lower manufacturing costs can be contributed to. Likewise, a number of vias can be kept low and thus contribute to simpler and/or more cost-effective printed circuit boards for contacting the LED chips.

In one embodiment according to the first aspect, the component has a diamond shape. In particular, the diamond shape corresponds to a diamond spanned by the LED chips of the component. An arrangement of a plurality of such components side by side is thereby simplified. In particular, a triangular configuration of the pixels can thus be taken into account.

In one embodiment according to the first aspect, the LED chips of a row each have a predetermined distance from each other. The offset in the extension direction is between 40% and 60% of the predetermined distance, in particular 50%.

In an embodiment according to the first aspect, the rows are arranged with respect to each other perpendicular to the extension direction at 90% to 110% of the predetermined distance, in particular at 100%.

In one embodiment according to the first aspect, two adjacent LED chips of a row and one further LED chip of an adjacent row arranged in the extension direction between the two LED chips each comprise a red LED chip, a green LED chip and a blue LED chip. Advantageously, a triangular pixel can be formed by the respective LED chips.

In one embodiment according to the first aspect, the component comprises $9 \cdot n^2$ LED chips, wherein $n \in \mathbb{N}$.

In one embodiment according to the first aspect, the predetermined distance is less than or equal to 1.5 mm, in particular less than or equal to 1 mm. For display devices with such small pixel pitches, high multiplexing rates in the range of 1/30 are typically used. In comparison, an increase in efficiency or useful life of the individual LED chips can be achieved with the present component.

In accordance with a second aspect of the invention, a display device is disclosed.

In an embodiment according to the second aspect, the display device comprises one or more components according to the first aspect arranged side by side in the extension direction and/or perpendicular to the extension direction, and an arrangement for providing control signals for sequentially driving the LED chips as pixels of the display device.

In an embodiment according to the second aspect, the plurality of components are arranged side by side such that the respective rows in the extension direction and the respective columns oblique to the extension direction are parallel, respectively, and collinear rows and columns of the components form respective rows and columns of the display device. The rows of the display device may also be referred to as rows.

In particular, the several components are arranged next to each other in such a way that the predetermined color sequence is maintained or continued both in the extension direction and obliquely to the extension direction.

In an embodiment according to the second aspect, the display device is configured as a video wall.

In an embodiment according to the second aspect, the LED chips are passively matrix connected and operated at a multiplex rate of 1/30 or higher.

According to a third aspect of the invention, there is disclosed a method of operating a display device according to the second aspect.

In an embodiment according to the third aspect, the method associates a first and an adjacent second LED chip of a first row of the display device and a third LED chip of an adjacent second row of the display device—the third LED chip being arranged in the extension direction between the first and second LED chips of the first row—each with a triangular first pixel.

Furthermore, each of the second LED chip and an adjacent fourth LED chip of the first row of the display device and a fifth LED chip of the second row—the fifth LED chip being arranged between the second and fourth LED chips of the first row in the extension direction—are associated with a triangular second pixel.

Further, each of the third LED chip and an adjacent sixth LED chip of the second row of the display device and a seventh LED chip of an adjacent third row of the display device—the seventh LED chip being arranged between the third and sixth LED chips of the second row in the extension direction—are assigned to a triangular third pixel.

Each pixel comprises a red, a green and a blue LED chip.

Furthermore, a first control signal for driving the LED chips associated with the first pixel, a second control signal for driving the LED chips associated with the second pixel, and a third control signal for driving the LED chips associated with the third pixel are sequentially provided.

Advantageously, the method allows the display device to operate with triangular pixels using individual LED chips to sequentially display multiple pixels.

In an embodiment according to the third aspect, except for LED chips in an outermost row or column of the display device, substantially each of the LED chips of the display device is used to sequentially display exactly three pixels.

In an embodiment according to the third aspect, each of the third LED chip and the sixth LED chip of the second row of the display device and the first LED chip of the adjacent first row of the display device—the first LED chip of the adjacent first row being arranged between the third and sixth LED chips of the second row in the extension direction—are associated with a triangular fourth pixel.

Furthermore, each of the fifth LED chip and an adjacent eighth LED chip of the second row of the display device and the fourth LED chip of the adjacent first row of the display device—the fourth LED chip of the adjacent first row being disposed between the fifth and eighth LED chips of the second row in the extension direction—are assigned to a triangular fifth pixel.

In addition, a fourth control signal for driving the LED chips associated with the fourth pixel and a fifth control signal for driving the LED chips associated with the fifth pixel are sequentially provided.

Advantageously, further virtual pixels may thus be implemented. In particular, the fourth and fifth pixels may have a triangular shape that is mirrored with respect to a triangular shape of the first, second and third pixels on an axis parallel to the extension direction. In other words, in this embodiment, another virtual pixel plane can be implemented by "rotated" or "flipped" triangles.

In an embodiment according to the third aspect, a faulty LED chip is detected. Furthermore, a next LED chip of the same color to the faulty LED chip is determined. Furthermore, for each faulty pixel to which the faulty LED chip is assigned, two LED chips are determined in each case, which are also assigned to the corresponding faulty pixel, and
the two determined LED chips and the determined LED chip of the same color next to the faulty LED chip are assigned to a replacement pixel.

In this case, a control signal representative of a control of the faulty pixel is provided for controlling the LED chips associated with the replacement pixel.

Advantageously, "dead pixels" can be compensated for in this way. In particular, if an LED chip within a pixel fails, an adjacent "virtual pixel" can display the corresponding content. A minimal shift in the position of the pixel center associated with this is to be preferred to a dead pixel.

A faulty LED chip can be a permanently lit or a permanently non-lit LED chip.

A closest LED chip of the same color to the defective LED chip is exemplarily determined depending on a distance in the extension direction and/or a distance perpendicular to the extension direction. In particular, a distance of a center of the three LED chips of the defective pixel to a center of a triangle between the potentially next LED chip and the two LED chips also associated with the corresponding defective pixel may be determined.

According to a fourth aspect of the invention, there is disclosed a computer program for operating a display device according to the second aspect. The computer program comprises instructions which, when the computer program is executed by a computer, cause the computer to perform the method according to the third aspect.

According to a fifth aspect of the invention, there is disclosed a computer-readable storage medium on which the computer program according to the fourth aspect is stored.

Further advantages, advantageous embodiments and further embodiments result from the embodiment examples described below in connection with the figures.

FIG. 1a shows exemplary components of a video wall;

FIGS. 1b, c show exemplary schematic circuit diagrams of a component according to FIG. 1a;

FIG. 2a show a first embodiment of diamond-shaped components of a further video wall;

FIG. 2b, c show exemplary sections of a component according to FIG. 2a;

FIG. 2d shows an exemplary flow chart for operating the video wall according to FIG. 2a;

FIGS. 3b, c show example sections of the video wall and a component, respectively, according to FIG. 3a.

Elements that are identical, similar or have the same effect are given the same reference signs in the figures. The figures and the proportions of the elements shown in the figures are not to be regarded as to scale. Rather, individual elements may be shown exaggeratedly large for better representability and/or for better comprehensibility.

Figure 1A:
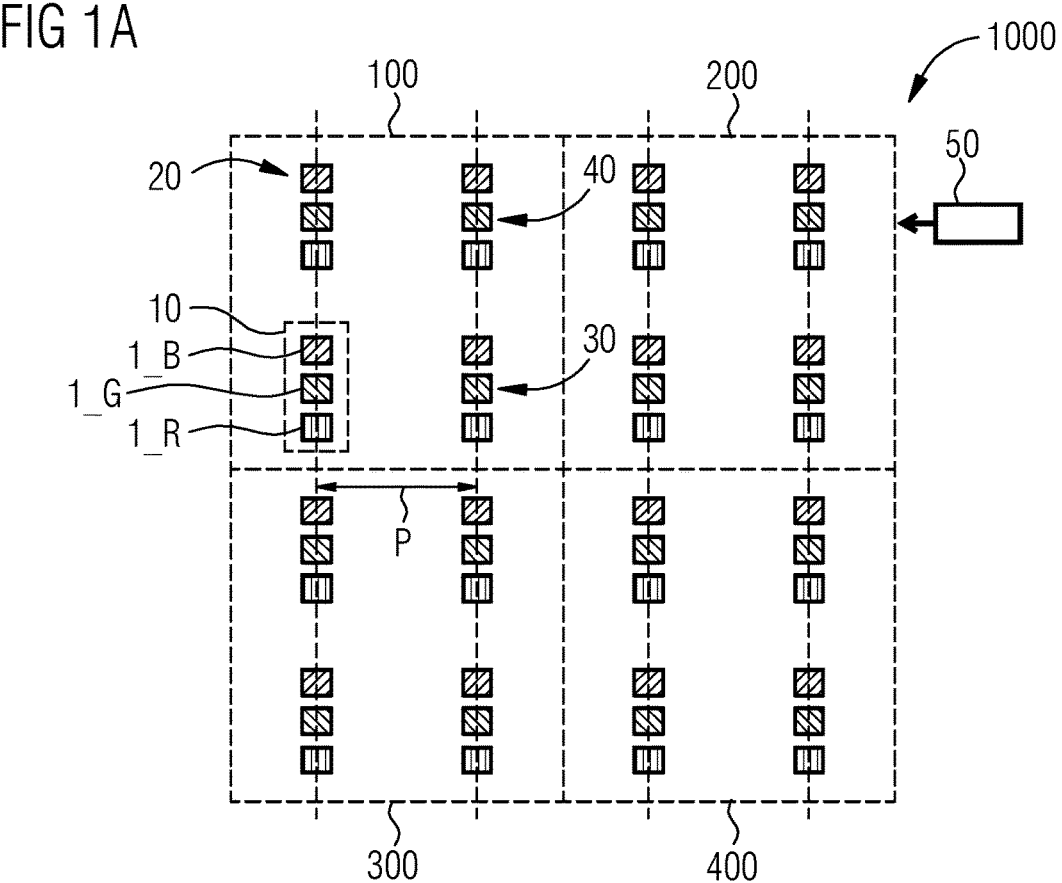

FIG. 1a shows several exemplary components 100, 200, 300, 400 of a video wall 1000 arranged side by side. For reasons of overview, only the component 100 will be discussed in the following.

The component 100 is formed to be surface-mountable and has twelve LED chips on a side facing away from its mounting surface, each of which has a red LED chip 1_R, a green LED chip 1_G, and a blue LED chip 1_B associated with a pixel 10 (shown only for the pixel 10 for overview purposes).

The pixels 10, 20, 30, 40 each correspond to a pixel of the video wall 1000 and can be activated or set to a color value by a corresponding control signal from a control unit 50 associated with the video wall 1000. In particular, the control signal for this purpose is representative of a brightness value of the individual LED chips 1_R, 1_G, 1_B associated with the respective pixel 10.

The LED chips assigned to pixels 10 and 30 are thereby arranged in a row at a horizontal distance P from each other, which corresponds approximately to a distance of the center of pixels 10 and 20 (corresponding in this example to the respective green LED chips). The distance P between the LED chips thus corresponds to the distance between the pixels, which may also be referred to as the "pitch". Here, the pitch P is 1.5 mm, 1 mm or less, by way of example.

Figure 1B:
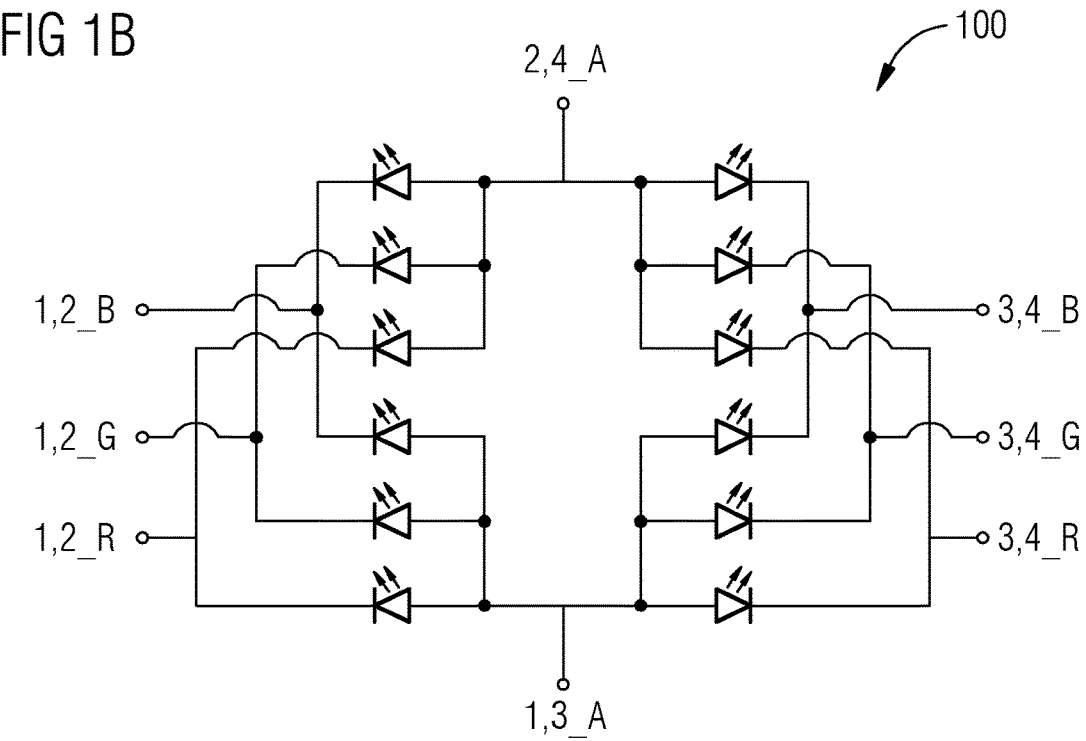

Referring to FIG. 1b, an exemplary first schematic circuit diagram of the component 100 according to FIG. 1a is shown. The LED chips associated with pixels 10, 30 share a common anode 1,3_A; the LED chips associated with pixels 20, 40 share another common anode 2,4_A. The red LED chips associated with pixels 10, 20 share a common cathode 1,2_R; the green LED chips associated with pixels 10, 20 share a common cathode 1,2_G; and the blue LED chips associated with pixels 10, 20 share a common cathode 1,2_B. The red LED chips associated with pixels 30, 40 share a common cathode 3,4_R; the green LED chips associated with pixels 30, 40 share a common cathode 3,4_G; and the blue LED chips associated with pixels 30, 40 share a common cathode 3,4_B. Thus, in this example, the component 100 has eight electrodes for contacting on a circuit board, such as for soldering.

Figure 1C:
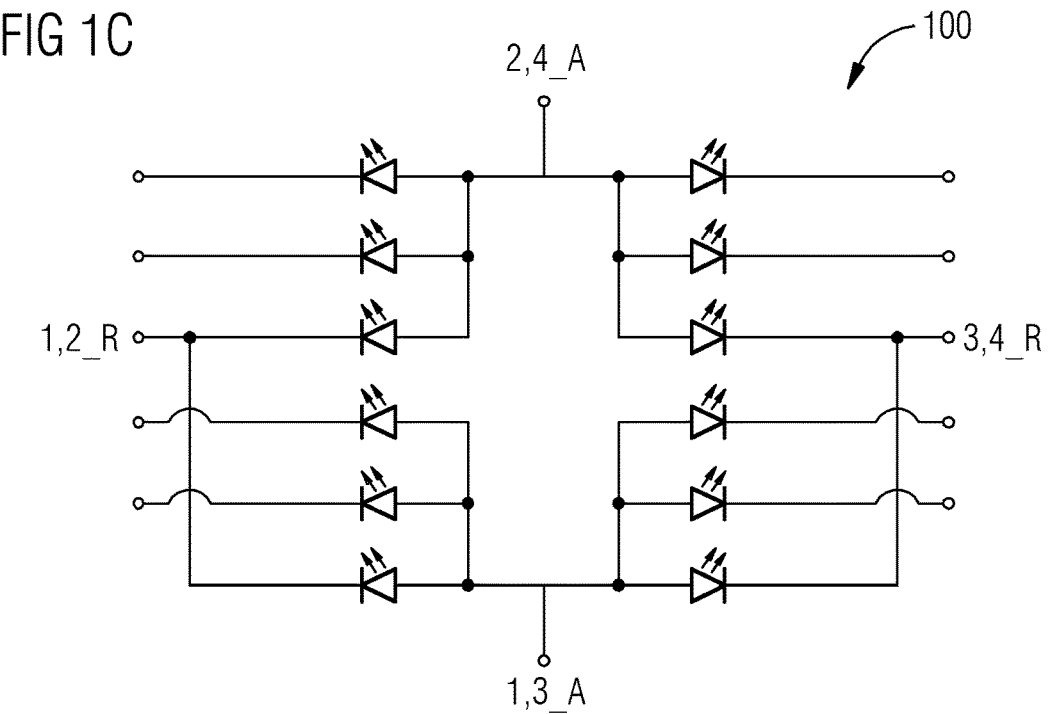

With reference to FIG. 1c, an exemplary second schematic circuit diagram of the component 100 according to FIG. 1a is shown, which differs from the first schematic circuit diagram in that only the red LED chips assigned to pixels 10, 20 or 30, 40 share a common cathode 1,2_R or 3,4_R respectively. Thus, in this example, the component 100 has twelve electrodes for contacting on a printed circuit board. Compared to the previous example, only smaller solder pads can be used here due to space constraints, so that a less stable solder connection and overall higher manufacturing costs can be assumed. The number of necessary vias also increases in comparison, so that the printed circuit board intended for assembly is also more complex and more expensive to manufacture.

Exemplarily, the pixels 10-40 of the component 100 according to FIGS. 1a-1c are operated in a passive matrix circuit and, in particular, in the case of small pixel pitches ≤1.5 mm, are driven at high multiplexing rates of 1/30 or higher, that is, each LED chip is driven to emit light only 1/30 of the time or less. Components 101, 201, 301, 401; 102, 202, 302, 402 are disclosed below in which individual LED chips are used to display a plurality of pixels, thereby achieving an increase in efficiency ("utilization") with respect to the high multiplexing rate. In particular, a component efficiency may be increased such that each LED chip emits light 1/15 of the time, 1/10 of the time, or more while maintaining a high multiplexing rate.

Figure 2A:
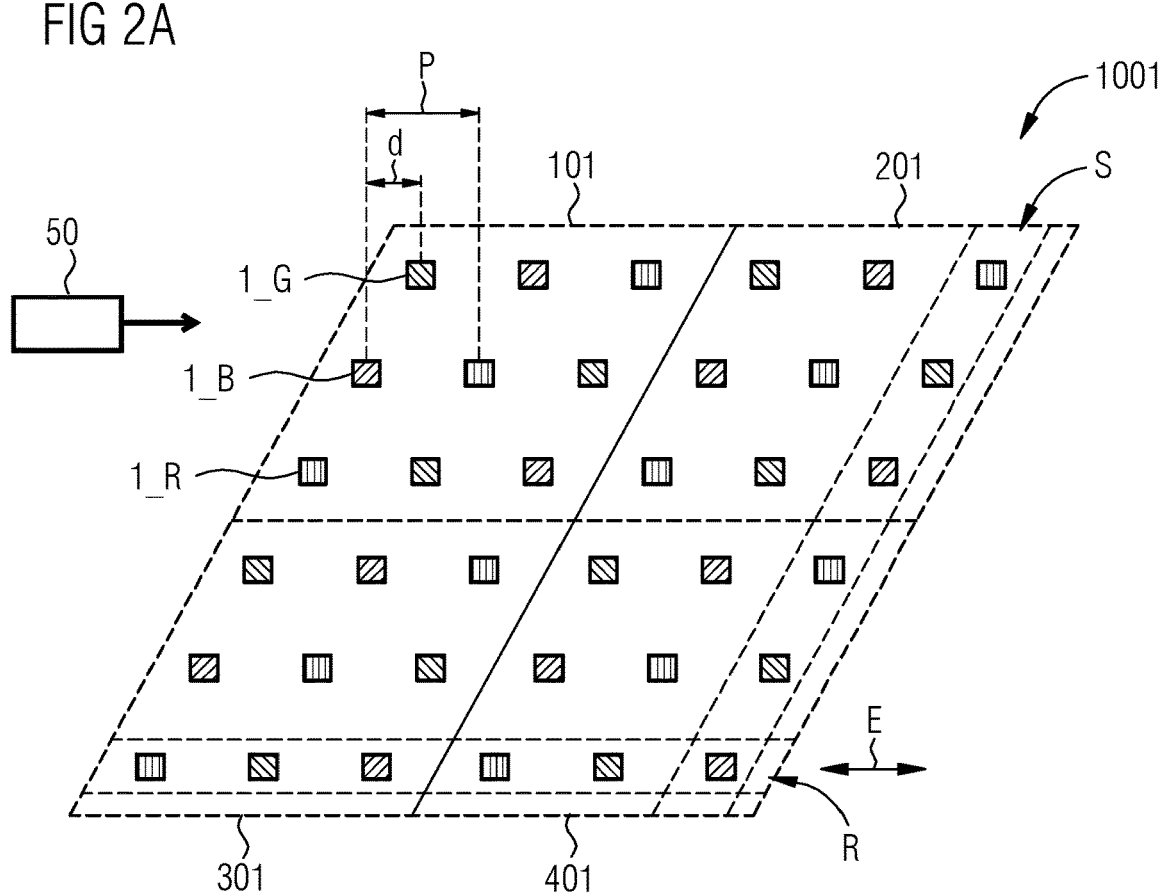

Referring to FIG. 2a, a first embodiment of a plurality of juxtaposed diamond-shaped components 101, 201, 301, 401 of a video wall 1001 is illustrated.

The components 101-401 are designed to be surface-mountable and each have nine LED chips on a side facing away from their mounting surface, of which in each case one red LED chip 1_R, one green LED chip 1_G and one blue LED chip 1_B are arranged successively in rows R and columns S in a fixed color sequence (for reasons of clarity, only one row R or column S is highlighted in each case), in such a way that the rows R or columns S of the individual components 101-401 run parallel to one another. In this case, the components 101-401 are arranged side by side in such a way that the individual rows R or columns S of the components 101-401 merge into each other or run collinearly, continuing the color sequence. In other words, a totality of the rows R and columns S of the components 101-401 form rows and columns of the video wall 1001. As an example, the LED chips of the same color are arranged on diagonally extending straight lines through the display device 1001.

The LED chips are arranged in the extension direction E as well as perpendicular to the extension direction E each at a predetermined distance P, which in this embodiment example is 1 mm. The rows R have a predetermined offset d with respect to each other in their main extension direction E, which corresponds to half the distance P, as an example. The columns S include a predetermined angle with the main extension direction E, which in this embodiment example is 60°.

Figure 2B:
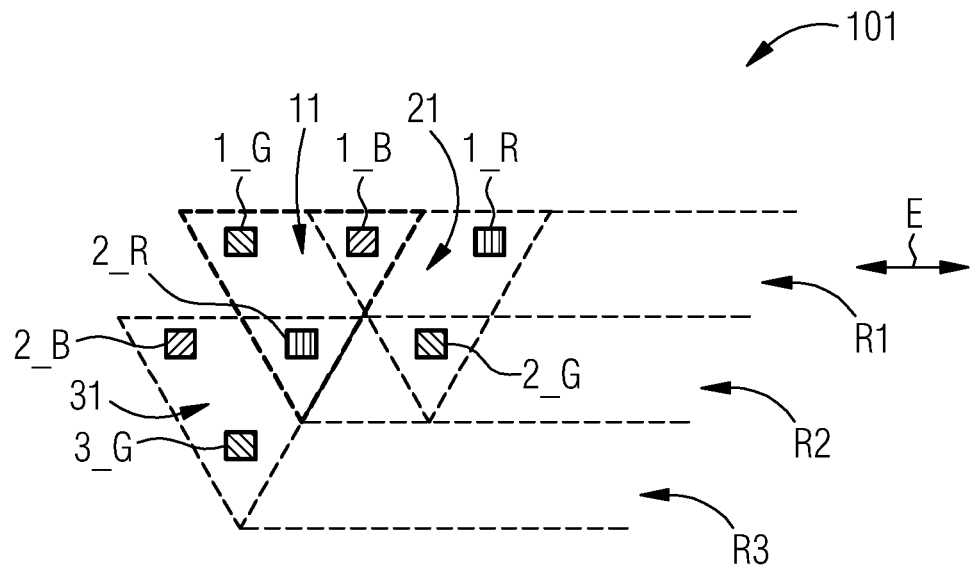

FIG. 2b shows an exemplary section of the component 101 according to FIG. 2a. Similar to the example of FIG. 1a, three differently colored LED chips, i.e. a red LED chip 2_R, a green LED chip 1_G and a blue LED chip 1_B, are each associated with a first pixel 11 (each indicated by a dashed triangular outline), the green and blue LED chips 1_G, 1_B being arranged in a first row R1 of the component 101 and the video wall 1001 respectively, and the red LED chip 2_R being arranged in an adjacent second row R2.

The same blue LED chip 1_B and a red LED chip 2_R in the first row R1 and a green LED chip 2_G in the second row R2 are assigned to a second pixel 21 adjacent with respect to the first pixel 11 in the main extension direction E.

The same red LED chip 2_R and a blue LED chip 2_B in the second row R2, and a green LED chip 3_G in the third row R3 are assigned to a third pixel 31 adjacent to the main extension direction E obliquely with respect to the first pixel 11.

In other words, individual LED chips are used to sequentially display multiple pixels. Multiple assignment of individual LED chips to different pixels is thereby also performed across components, i.e., a pixel may also have LED chips assigned to it that are arranged on different components. In particular, except for those LED chips that are assigned to a first or last row or column of the video wall 1001, each LED chip is assigned to exactly three pixels, or is used to sequentially display these three pixels. The pixel pitch or "pitch" corresponds to the distance P between the individual LED chips.

Here, the components 101-401 comprise a number of 3×3 LED chips and are formed in a diamond shape to accommodate the triangular shape of the pixels. In other embodiments, the components 101-401 may also comprise more than three LED chips by an integer multiple n in the extension direction and perpendicular to the extension direction, that is, a number of 3n×3n LED chips. For high pixel numbers of the video wall 1001, a ratio of required LED chips per pixel approaches 1:1, i.e., one LED chip is required per pixel. In contrast, the video wall 1001 shown in FIGS. 1a-1c requires three LED chips per pixel.

Figure 2C:
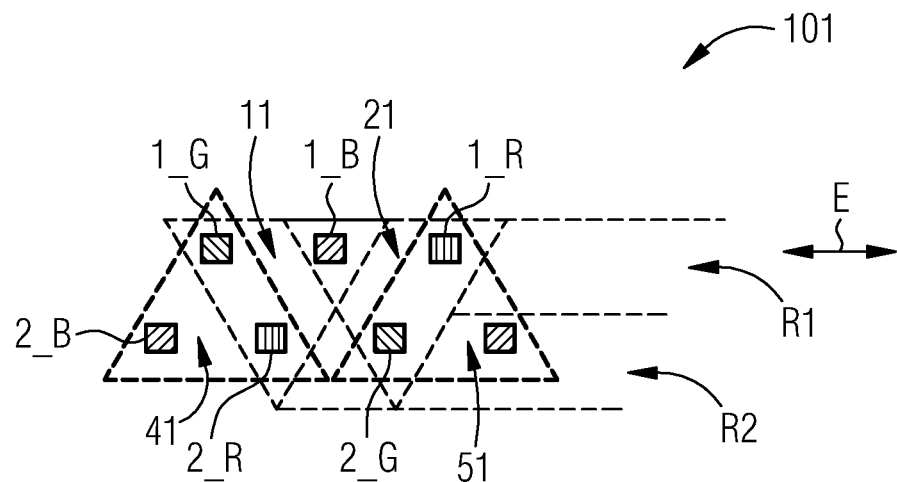

The exemplary section of the component 101 shown in FIG. 2a on the basis of FIG. 2c differs from the section shown in FIG. 2b in that, in addition to the pixels 11, 21, 31, a fourth and a fifth pixel 41, 51 are formed by assigning individual LED chips to mirrored triangular shapes with respect to the triangular pixels 11, 21, 31. Thus, the green LED chip 1_G and the red LED chip 2_R of the first pixel 11 are assigned to the fourth pixel 41 together with the blue pixel 2_B of the third pixel 31. The fifth pixel 51 is assigned the red pixel 1_R and the green pixel 2_G of the second pixel, as well as another blue LED chip adjacent with respect to the green LED chip 2_G in the main extension direction E, so that even fewer LED chips are required per pixel in the video wall 1001 compared to the structure according to FIG. 2b.

Overall, fewer contacts are required for the video wall 1001 shown in FIGS. 2a-2c because fewer LED chips contribute to the formation of each pixel. As a result, comparatively larger solder pads can be used, allowing for a more stable solder connection and lower manufacturing costs. Furthermore, fewer vias are required, allowing simpler or lower cost PCBs to be used. The use of individual LED chips for several pixels also contributes to a higher efficiency or "utilization" of the individual LED chips, especially under high multiplex rates or small pixel pitches (so-called "narrow pitch").

To further minimize the number of backside contacts of the components 101-401 shown in FIGS. 2a-2c, the incorporated LED chips may have a common anode (so-called "common anode") or cathode, analogous to the components 100-400 shown in FIGS. 1a-1c.

Figure 2D:
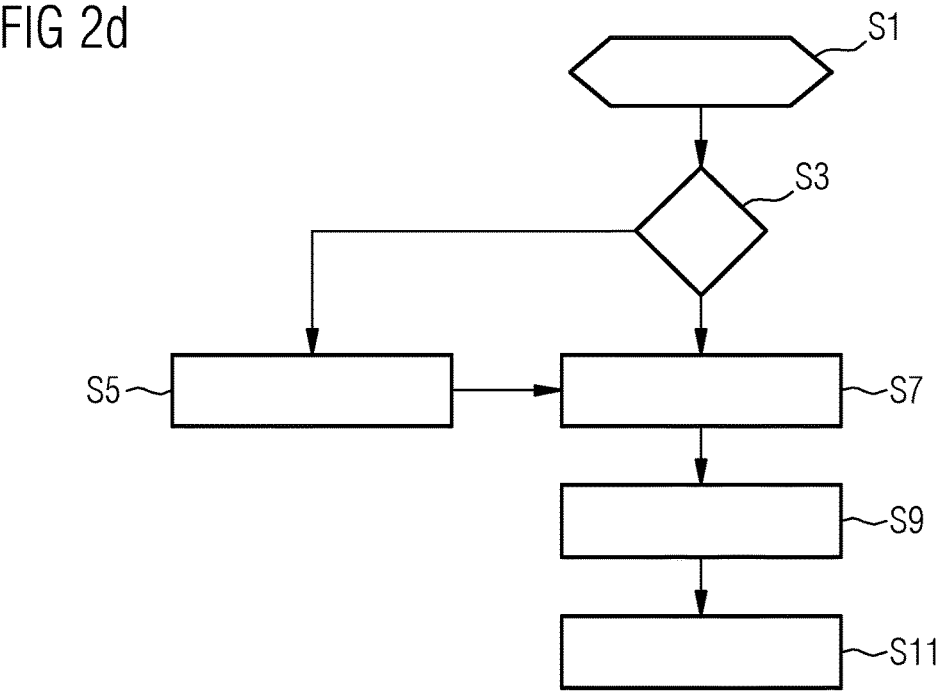

In a data and program memory of a control unit 50 associated with the video wall 1001, a program for operating the display device 1001 according to FIG. 2a is stored, which is explained in more detail below with reference to the flow chart of FIG. 2d.

In a step S1, adjacent LED chips of a respective row of the video wall 1001 and an LED chip of an adjacent row of the video wall 1001 arranged therebetween in the extension direction E are first assigned to a respective triangular pixel of the video wall 1001, so that each pixel of the video wall 1001 comprises a red LED chip, a green LED chip, and a blue LED chip.

In a subsequent step S3, it is checked whether an LED chip of the video wall 1001 is faulty. By way of example, it is checked in this context whether there is a short circuit or an open circuit on one of the LED chips.

In the event that an LED chip is detected as faulty, the program is continued in a step S5. Otherwise, the program is continued in a step S7.

In step S5, a next LED chip of the same color as the faulty LED chip is determined. For this purpose, a center point of the triangle of the defective pixel is determined by way of example, and a corresponding center point of a triangle of a potential substitute pixel, comprising the two functional LED chips which are also assigned to the defective pixel, and an LED chip of the same color which is close to the defective LED chip, with that LED chip of the same color which is close being used as the next LED chip for forming the substitute pixel with the shortest distance between the center points. Advantageously, this results in a minimal positional shift of the pixel center. The program is then continued in step S7.

In step S7, image data intended for display on the display device 1001 is provided to the control unit 50. In particular, the image data comprises brightness values of pixels arranged in a matrix-like manner in the RGB color space.

In a subsequent step S9, the pixels to be displayed are assigned to the individual pixels of the display device 1001 or to the LED chips 1_G, 1_B, 1_R of the components 101-401 arranged next to each other. In the case where a defective pixel was present, a pixel to be displayed assigned to the defective pixel is in particular assigned to the replacement pixel.

In a subsequent step S9, control signals for driving the LED chips 1_G, 1_B, 1_R associated with the individual pixels are sequentially output. In particular, the corresponding LED chips 1_G, 1_B, 1_R are controlled in such a way that their emitted light corresponds to a brightness value of the corresponding image data or an image corresponding to the image data is formed on the video wall 1001. In the event that a defective pixel was present, in particular a control signal representative of a control of the defective pixel is thereby provided for controlling the LED chips associated with the replacement pixel. The method is then terminated, for example, or repeated in step S7 with new image data.

Figure 3A:
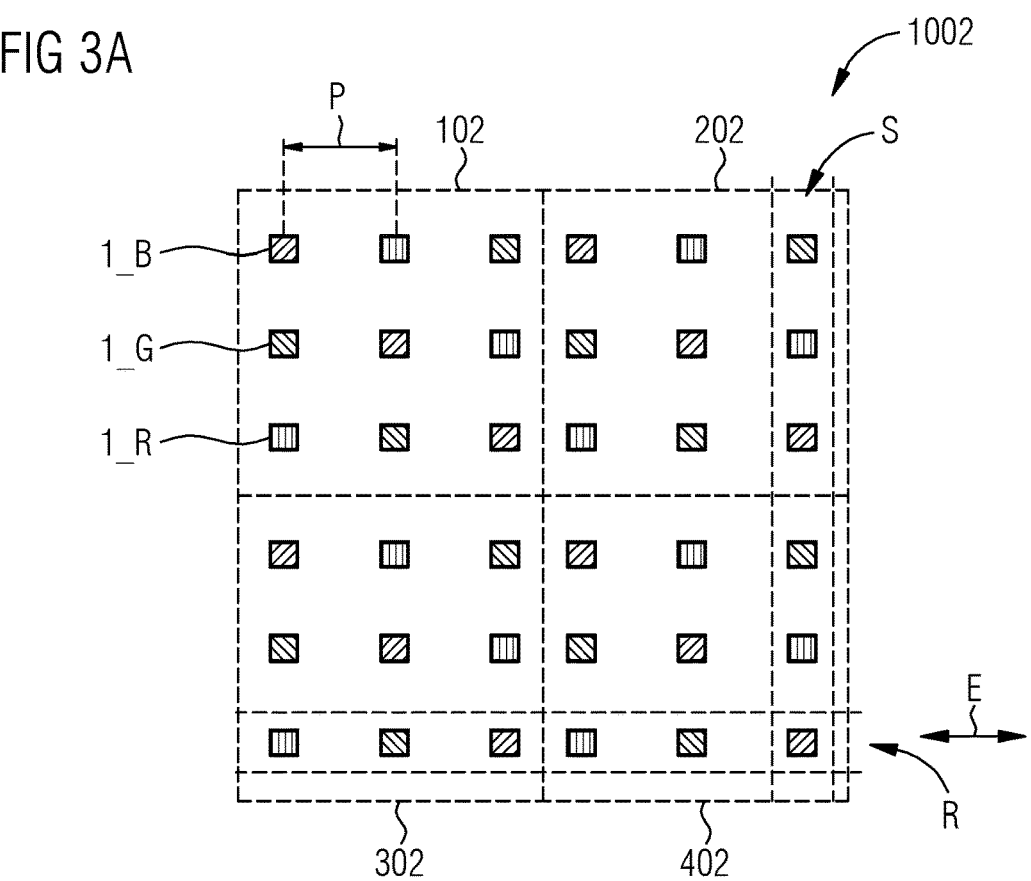
FIG. 3a shows a second embodiment of square components of a further video wall.

Referring to FIG. 3a, a second embodiment of a plurality of juxtaposed square components 102, 202, 302, 402 of a video wall 1002 is illustrated. Exemplary operation of the video wall 1002 may be analogous to the flowchart shown in FIG. 2d.

The components 102-402 are designed to be surface-mountable and each have nine LED chips on a side facing away from their mounting surface, of which in each case one red LED chip 1_R, one green LED chip 1_G and one blue LED chip 1_B are arranged successively in rows R and columns S in a fixed color sequence (for reasons of clarity, only one row R or column S is highlighted in each case), and in such a way that the rows R or columns S of the individual components 102-402 run parallel to one another. In this case, the components 102-402 are arranged side by side in such a way that the individual rows R or columns S of the components 102-402 merge into each other or run collinearly, continuing the color sequence. In other words, a totality of the rows R and columns S of the components 102-402 form rows and columns of the video wall 1002.

The LED chips are arranged in the extension direction E and perpendicular to the extension direction E, respectively, at a predetermined pitch P, which is 1 mm in this embodiment example. The columns S are arranged perpendicular to the rows R.

Figure 3B:
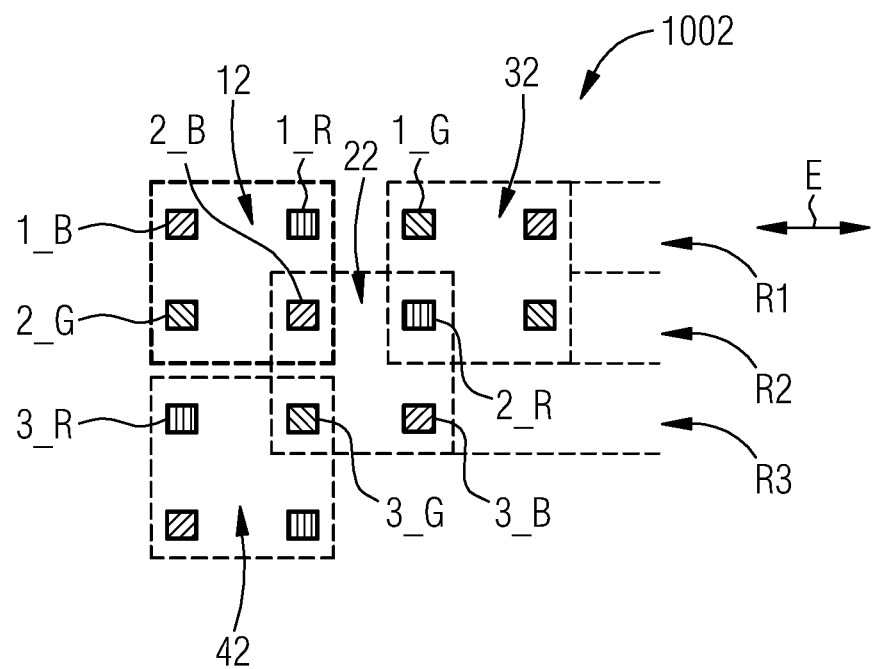

FIG. 3b shows an exemplary section of the video wall 1002 according to FIG. 3a. In each case four LED chips, of which three are of different colors, i.e. two blue LED chips 1_B, 2_B, one red LED chip 1_R and one green LED chip 1_G, are assigned to a first pixel 12 (in each case marked by a dashed square border), the blue and the red LED chip 1_B, 1_R being arranged in a first row R1 of the video wall 1002, and the green and the further blue LED chip 2_G, 2_B being arranged in an adjacent second row R2. Further pixels of the video wall 1002 are also formed by four LED chips, with alternating duplications of two LED chips of each color.

The same blue LED chip 2_B with respect to the first pixel 12 and the same red LED chip 2_R with respect to the third pixel 32 in the second row R2, the same green LED chip 3_G with respect to the fourth pixel 42 and a further blue LED chip 3_B in the third row R3 are assigned to a second pixel 22 which is adjacent to the first, third and fourth pixels 12, 32, 42 obliquely with respect to the main extension direction E.

Figure 3C:
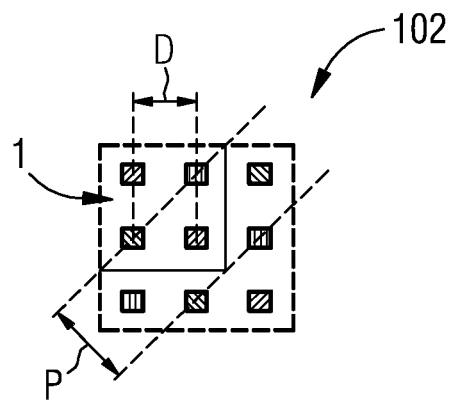

In other words, individual LED chips are used to sequentially represent multiple pixels. Multiple assignment of individual LED chips to different pixels is thereby also performed across components, i.e., a pixel may also have LED chips assigned to it that are arranged on different components. In particular, except for those LED chips that are assigned to a first or last row or column of the video wall 1002, each LED chip is assigned to exactly two pixels, or is used to sequentially display these two pixels. As shown in FIG. 3c, the pixel pitch corresponds to √2 times the distance D between the individual LED chips.

Here, the components 102-402 have a number of 3×3 LED chips and are formed in a square shape. In other embodiments, the components 102-402 may also comprise more than three LED chips by an integer multiple n in the extension direction and perpendicular to the extension direction, that is, a number of 3n×3n LED chips. For high pixel numbers of the video wall 1002, a ratio of required LED chips per pixel approaches 2:1, i.e., two LED chips are required per pixel. In contrast, three LED chips are required per pixel for the video wall 1002 shown in FIGS. 1a-1c.

Overall, fewer contacts are required for the video wall 1002 shown in FIGS. 3a-3c because fewer LED chips contribute to the formation of each pixel. As a result, comparatively larger solder pads can be used, allowing for a more stable solder connection and lower manufacturing costs. Furthermore, fewer vias are required, allowing simpler or lower cost PCBs to be used. The use of individual LED chips for several pixels also contributes to a higher efficiency or "utilization" of the individual LED chips, especially under high multiplex rates or small pixel spacings.

To further minimize the number of backside contacts of the components 102-402 shown in FIGS. 3a-3c, the packaged LED chips may have a common anode (so-called "common anode") or cathode, analogous to the components 102-402 shown in FIGS. 1a-1c.

The invention is not limited to the embodiments by the description based thereon. Rather, the invention encompasses any new feature as well as any combination of features, which in particular includes any combination of features in the patent claims, even if this feature or combination itself is not explicitly stated in the patent claims or embodiments.

The invention claimed is:

1. A display device, comprising four or more components, wherein each of the four components comprises light-emitting-diode (LED) chips arranged in rows,
   wherein the LED chips comprise red LED chips, green LED chips, and blue LED chips,
   wherein the red LED chips, the green LED chips, and the blue LED chips are arranged in a predetermined color sequence so that the same colors follow one another in an extension direction and obliquely to the extension direction and an arrangement of the LED chips is repeated such that the predetermined color sequence is maintained,
   wherein two adjacent rows have an offset with respect to one another in the extension direction,
   wherein the four or more components are arranged next to one another in the extension direction and/or perpendicular to the extension direction,
   wherein the display device comprises a control unit configured to provide control signals for sequentially driving the LED chips as pixels of the display device, and
   wherein the display device is configured:
     to detect a faulty LED chip,
     to determine an adjacent LED chip of a same color as the detected faulty LED chip and being next to the detected faulty LED chip,
     per defective pixel to which the detected faulty LED chip is assigned: to determine two corresponding LED chips assigned to the corresponding defective pixel, and to assign the two corresponding LED chips and the adjacent LED chip of the same color to a replacement pixel, and
     to provide a control signal representative of a control of the defective pixel for controlling the LED chips associated with the replacement pixel.

2. The display device according to claim 1, wherein LED chips of a row are arranged such that a predetermined distance is between centers of two adjacent LED chips, and the offset of two adjacent rows in the extension direction is between 40% and 60% of the predetermined distance.

3. The display device according to claim 2, wherein the rows are arranged such that a distance of two adjacent rows perpendicular to the extension direction is at 90% to 110% of the predetermined distance between the centers of the two adjacent LED chips.

4. The display device according to claim 2, wherein the predetermined distance between the centers of the two adjacent LED chips is less than or equal to 1 mm.

5. The display device according to claim 1, wherein a first LED chip of a first row, an adjacent second LED chip of the first row, and a third LED chip of an adjacent second row are implemented as a red LED chip, a green LED chip and a blue LED chip, wherein the third LED chip of the adjacent second row is arranged in the extension direction between the first LED chip and the second LED chip of the first row.

6. The display device according to claim 1, wherein the component comprises $9 \cdot n^2$ LED chips, wherein n is a natural number.

7. The display device according to claim 2, wherein a predetermined distance between centers of the two adjacent LED chips is less than or equal to 1.5 mm.

8. The display device according to claim 1, wherein the four or more components are arranged side by side such that the respective rows in the extension direction and the respective columns oblique to the extension direction are parallel, respectively, and collinear rows and columns of the components form rows and columns of the display device, respectively.

9. The display device according to claim 1, wherein the display device is configured in the form of a video wall.

10. The display device according to claim 1, wherein the LED chips are passively matrix connected.

11. A method of operating a display device according to claim 1, wherein a first LED chip and an adjacent second LED chip of a first row of the display device and a third LED chip of an adjacent second row of the display device are assigned to a triangular first pixel, wherein the third LED chip of the adjacent second row is arranged in the extension direction between the first LED chip and the second LED chip of the first row, the second LED chip and an adjacent fourth LED chip of the first row of the display device and a fifth LED chip of the second row are assigned to a triangular second pixel, wherein the fifth LED chip of the second row is arranged in the extension direction between the second LED chip and fourth LED chip of the first row, the third LED chip and an adjacent sixth LED chip of the second row of the display device and a seventh LED chip of an adjacent third row of the display device are assigned to a triangular third pixel, wherein the seventh LED chip of the adjacent third row is arranged in the extension direction between the third LED chip and sixth LED chip of the second row, and each pixel comprises a respective red LED chip, a respective green LED chip, and a respective blue LED chip, sequentially providing a first control signal for driving the LED chips associated with the first pixel, a second control signal for driving the LED chips associated with the second pixel, and a third control signal for driving the LED chips associated with the third pixel;

detecting a faulty LED chip;

determining an adjacent LED chip of a same color as the detected faulty LED chip and being next to the detected faulty LED chip;

per defective pixel to which the defected faulty LED chip is assigned:

determining two corresponding LED chips assigned to the corresponding defective pixel, and assigning the two corresponding LED chips and the adjacent LED chip of the same color to a replacement pixel; and providing a control signal representative of a control of the defective pixel for controlling the LED chips associated with the replacement pixel.

12. The method according to claim 11, wherein except for LED chips in an outermost row or column of the display device, substantially each of the LED chips of the display device is used to sequentially display exactly three pixels.

13. The method according to claim 11, in which the third LED chip and the sixth LED chip of the second row of the display device and the first LED chip of the adjacent first row of the display device are assigned to a triangular fourth pixel, wherein the first LED chip of the adjacent first row is arranged in the extension direction between the third and sixth LED chips of the second row, the fifth LED chip and an adjacent eighth LED chip of the second row of the display device and the fourth LED chip of the adjacent first row of the display device are assigned to a triangular fifth pixel, wherein the fourth LED chip of the adjacent first row is arranged in the extension direction between the fifth and eighth LED chips of the second row, and sequentially providing a fourth control signal for driving the LED chips associated with the fourth pixel, and a fifth control signal for driving the LED chips associated with the fifth pixel.

14. A non-transitory computer-readable medium for operating a display device according to claim 1, comprising instructions which, when executed by a computer, cause the computer to execute a method wherein:

a first LED chip and an adjacent second LED chip of a first row of the display device and a third LED chip of an adjacent second row of the display device are assigned to a triangular first pixel, wherein the third LED chip of the adjacent second row is arranged in the extension direction between the first LED chip and second LED chip of the first row, the second LED chip and an adjacent fourth LED chip of the first row of the display device and a fifth LED chip of the second row are assigned to a triangular second pixel, wherein the fifth LED chip of the second row is arranged in the extension direction between the second LED chip and fourth LED chip of the first row, the third LED chip and an adjacent sixth LED chip of the second row of the display device and a seventh LED chip of an adjacent third row of the display device are assigned to a triangular third pixel, wherein the seventh LED chip of the adjacent third row is arranged in the extension direction between the third LED chip and sixth LED chip of the second row, each pixel comprises a respective red LED chip, a respective green LED chip, and a respective blue LED chip, and sequentially providing a first control signal for driving the LED chips associated with the first pixel, a second control signal for driving the LED chips associated with the second pixel, and a third control signal for driving the LED chips associated with the third pixel.

15. A display device, comprising four or more components arranged next to one another in an extension direction and/or perpendicular to the extension direction, and a control unit configured to provide control signals for sequentially driving light-emitting-diode (LED) chips as pixels of the display device, wherein each component comprises the LED chips arranged in rows, wherein the LED chips comprise red LED chips, green LED chips, and blue LED chips, wherein the red LED chips, the green LED chips, and the blue LED chips are arranged in a predetermined color sequence so that the same colors follow one another in the extension direction and obliquely to the extension direction, wherein two adjacent rows have an offset with respect to one another in the extension direction, wherein a multiple assignment of individual LED chips to different pixels is performed so that individual LED chips are used to sequentially display multiple pixels; and wherein the display device is configured:
to detect a faulty LED chip,
to determine an adjacent LED chip of a same color as the detected faulty LED chip and being next to the detected faulty LED chip,
per defective pixel to which the detected faulty LED chip is assigned: to determine two corresponding LED chips assigned to the corresponding defective pixel, and to assign the two corresponding LED chips and the adjacent LED chip of the same color to a replacement pixel, and
to provide a control signal representative of a control of the defective pixel for controlling the LED chips associated with the replacement pixel.

16. A display device, comprising four or more components,
wherein each of the four components comprises light-emitting-diode (LED) chips arranged in rows,
wherein the four or more components are arranged next to one another in an extension direction and/or perpendicular to the extension direction,
wherein two adjacent rows have an offset with respect to one another in the extension direction,
wherein the LED chips comprise red LED chips, green LED chips, and blue LED chips,
wherein the red LED chips, the green LED chips, and the blue LED chips are arranged in a predetermined color sequence so that the same colors follow one another in the extension direction and obliquely to the extension direction,
wherein the display device comprises a control unit configured to provide control signals for sequentially driving the LED chips as pixels of the display device, wherein
a first LED chip and an adjacent second LED chip of a first row of the display device and a third LED chip of an adjacent second row of the display device are assigned to a triangular first pixel, wherein the third LED chip of the adjacent second row is arranged in the extension direction between the first LED chip and the second LED chip of the first row,
the second LED chip and an adjacent fourth LED chip of the first row of the display device and a fifth LED chip of the second row are assigned to a triangular second pixel, wherein the fifth LED chip of the second row is arranged in the extension direction between the second LED chip and fourth LED chip of the first row, and
the third LED chip and an adjacent sixth LED chip of the second row of the display device and a seventh LED chip of an adjacent third row of the display device are assigned to a triangular third pixel, wherein the seventh LED chip of the adjacent third row is arranged in the extension direction between the third LED chip and sixth LED chip of the second row,
wherein each pixel comprises a respective red LED chip, a respective green LED chip, and a respective blue LED chip,
wherein the control unit is configured to sequentially provide a first control signal for driving the LED chips associated with the first pixel, a second control signal for driving the LED chips associated with the second pixel, and a third control signal for driving the LED chips associated with the third pixel, and
wherein the display device is configured to:
detect a faulty LED chip,
determine an adjacent LED chip of a same color as the detected faulty LED chip and being next to the detected faulty LED chip,
per defective pixel to which the detected faulty LED chip is assigned, determine two corresponding LED chips assigned to the corresponding defective pixel, and assign the two corresponding LED chips and the adjacent LED chip of the same color to a replacement pixel, and
provide a control signal representative of a control of the defective pixel for controlling the LED chips associated with the replacement.

* * * * *